US012638584B2

(12) United States Patent　(10) Patent No.: US 12,638,584 B2
Fabian　(45) Date of Patent: May 26, 2026

(54) ITEM SCANNER DISTANCE-ENABLED FUNCTIONING

(71) Applicant: NCR Voyix Corporation, Atlanta, GA (US)

(72) Inventor: Kenneth Joseph Fabian, Grayson, GA (US)

(73) Assignee: NCR Voyix Corporation, Atlanta, GA (US)

( * ) Notice: Subject to any disclaimer, the term of this patent is extended or adjusted under 35 U.S.C. 154(b) by 968 days.

(21) Appl. No.: 16/368,793

(22) Filed: Mar. 28, 2019

(65) Prior Publication Data

US 2020/0309948 A1　Oct. 1, 2020

(51) Int. Cl.
　　*G01S 17/08*　　(2006.01)
　　*G01S 15/08*　　(2006.01)
　　*G01S 17/89*　　(2020.01)
　　*G06T 7/246*　　(2017.01)
(52) U.S. Cl.
　　CPC .............. *G01S 17/08* (2013.01); *G01S 15/08* (2013.01); *G01S 17/89* (2013.01); *G06T 7/246* (2017.01); *G06T 2207/10048* (2013.01)
(58) Field of Classification Search
　　None
　　See application file for complete search history.

(56) References Cited

U.S. PATENT DOCUMENTS

| | | | | |
|---|---|---|---|---|
| 10,255,777 | B1 * | 4/2019 | Soto ..................... | G08B 13/242 |
| 2004/0065740 | A1 * | 4/2004 | Mergenthaler ....... | G06K 7/1096 |
| | | | | 235/462.14 |
| 2008/0252985 | A1 * | 10/2008 | Zhu .................... | G06K 7/10782 |
| | | | | 359/641 |
| 2012/0181338 | A1 | 7/2012 | Gao | |
| 2013/0082104 | A1 | 4/2013 | Kearney et al. | |
| 2014/0061308 | A1 | 3/2014 | Madej et al. | |
| 2016/0012269 | A1 * | 1/2016 | Kowalczyk ........ | G06K 7/10881 |
| | | | | 235/462.21 |
| 2016/0104019 | A1 * | 4/2016 | Todeschini ........... | G06K 7/1426 |
| | | | | 235/472.01 |
| 2018/0024907 | A1 * | 1/2018 | Caution .............. | G06F 11/3495 |
| | | | | 709/223 |
| 2018/0059245 | A1 | 3/2018 | Meinherz et al. | |
| 2018/0121695 | A1 | 5/2018 | Ynclino, V et al. | |
| 2018/0247292 | A1 | 8/2018 | Crooks et al. | |

OTHER PUBLICATIONS

EP Search Report.
"European Application Serial No. 19220182.0, Communication pursuant to Article 94(3) EPC mailed May 13, 2024", 11 pgs.

* cited by examiner

*Primary Examiner* — Stuart D Bennett
(74) *Attorney, Agent, or Firm* — Schwegman Lundberg & Woessner, P.A.

(57)　　　　　ABSTRACT

Various embodiments herein each include at least one of systems, devices, software, and method for item scanner distance-enabled functioning. One such embodiment is in the form of a method and includes receiving a distance measurement from a first TOF sensor co-located with a first camera of an item scanner of a terminal and determining further data processing activity to perform or initiate based on a current state of the terminal and the received distance measurement. This method embodiment may then perform or initiate the determined further data processing activity.

20 Claims, 5 Drawing Sheets

400

402

RECEIVE A DISTANCE MEASUREMENT FROM A FIRST TOF SENSOR CO-
LOCATED WITH A FIRST CAMERA OF AN ITEM SCANNER OF A TERMINAL

404

DETERMINE FURTHER DATA PROCESSING ACTIVITY TO PERFORM OR
INITIATE BASED ON A CURRENT STATE OF THE TERMINAL AND THE
RECEIVED DISTANCE MEASUREMENT

406

PERFORM OR INITIATE THE DETERMINED FURTHER DATA PROCESSING
ACTIVITY

ITEM SCANNER DISTANCE-ENABLED FUNCTIONING

BACKGROUND INFORMATION

As checkout terminals at retail locations have become more computerized, the terminals are being asked to do more and more. At the same time, there are goals of reducing the cost of deploying and maintaining checkout terminals. Part of this effort has included minimizing computing resources in product scanners and instead relying on computing resources of computers that control operation of the checkout terminal. Further constraining computing power in the interest of lower costs is the use of only a single computer to control operation of two or more terminals. The result is centralized computing resources with competing utilization needs.

At the same time, efficient use of checkout terminals by cashiers at cashier-assisted checkouts and customers at self-service checkouts remains important. This efficiency is not only with regard to direct utilization of a checkout terminal but also accuracy in the use thereof for purposes of security, shrinkage mitigation, and surveillance.

SUMMARY

Various embodiments herein each include at least one of systems, devices, software, and method for item scanner distance-enabled functioning. One such embodiment is in the form of a system. A system of such embodiments includes a processor, at least one terminal, and an item scanner deployed at one of the at least one terminals. The item scanner in some such embodiments includes at least one camera and a co-located a time-of-flight (TOF) sensor that operates to measure a distance between the sensor and a subject captured in an image by the at least one camera. The system also includes at least one memory with instructions stored thereon that are executable by the processor with regard to data processing activities to control each of the at least one terminals. The instructions in such embodiments are also executable with regard to a first terminal to perform data processing activities. These data processing activities may include receiving a distance measurement from a first TOF sensor co-located with a first camera of an item scanner of the first terminal and determining further data processing activity to perform or initiate based on a current state of the first terminal and the received distance measurement. The data processing activities further include performing or initiating the determined further data processing activity.

Another embodiment, in the form of a method, includes receiving a distance measurement from a first TOF sensor co-located with a first camera of an item scanner of a terminal, determining further data processing activity to perform or initiate based on a current state of the terminal and the received distance measurement, and performing or initiating the determined further data processing activity.

A further method embodiment includes reading a product identifier of an item presented to a product scanner of a Point-of-Sale (POS) terminal. This method also includes receiving a distance measurement from a TOF sensor co-located with the product scanner of the POS terminal and then performing data processing activity identified based on a current state of the terminal and the received distance measurement.

DETAILED DESCRIPTION

Figure 1:
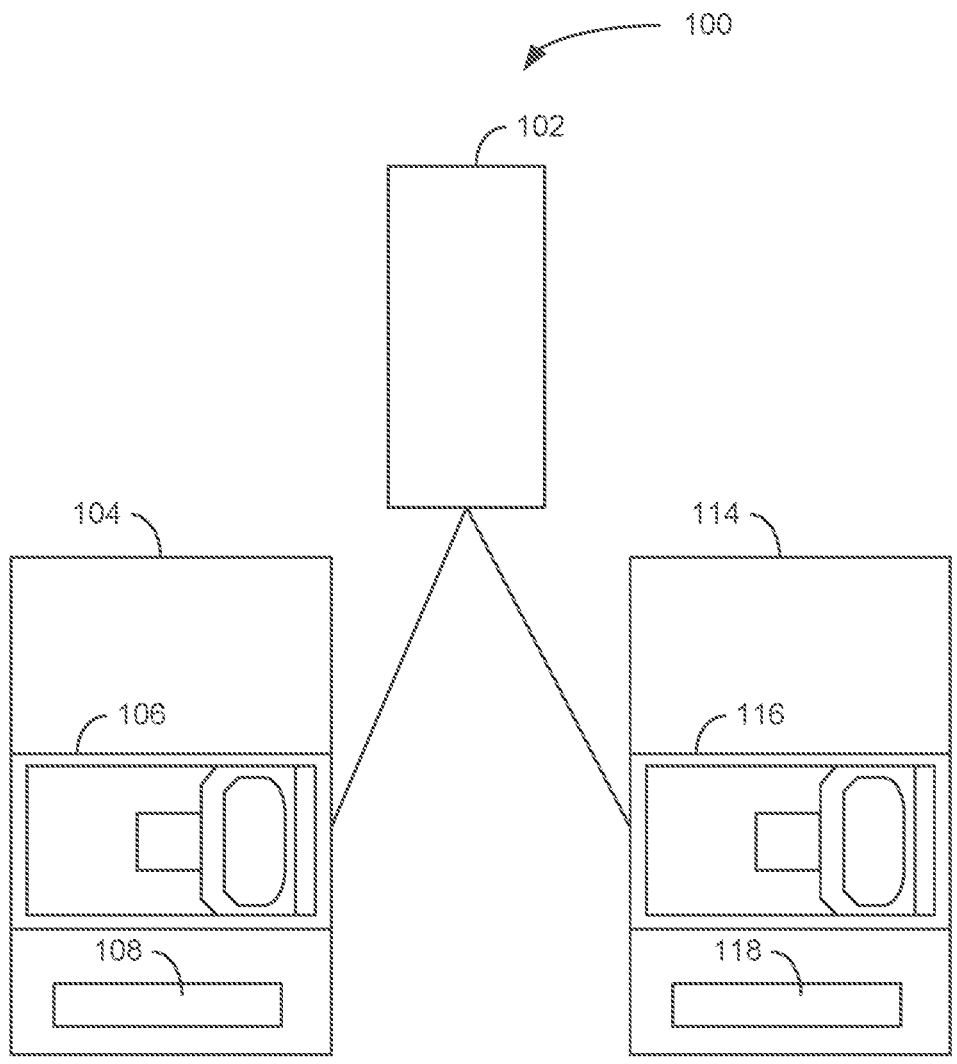
FIG. 1 is a logical computing system architectural diagram, according to an example embodiment.

Various embodiments herein each include at least one of systems, devices, software, and method for item scanner distance-enabled functioning. Some such embodiments address one or more of the issues noted above, and others. For example, where multiple checkout terminals are controlled by a single computer, some embodiments enable transitioning individual checkout terminals between dormant and active modes of operation to free up computing resources of the controlling computer by reducing loads from dormant terminals for servicing data processing needs of active terminals. Efficiency of terminals and store security can also be improved by these and other embodiments, such as by ensuring products presented for scanning at a terminal are located at a proper distance to have radio frequency security tags deactivated at the time of scanning and measuring a distance between an item and a camera to focus the camera and adjust scan field lighting to improve capture of product identifiers in images from which product identifiers are read. These and other benefits are provided herein by inclusion of one or more Time-of-Flight (TOF) sensors at checkout terminals, such as within a product scanner, to measure a distance from a respective scanner and a subject. The subject in such embodiments may be a product presented for scanning, a person in a field of view of a product scanner camera and within a distance therefrom measurable by a TOF sensor.

Further, a TOF sensor, other sensor such as phase shift pixels, in an image sensor array, can be used to detect the distance between an object and a product scanner window(s). Such a sensor can also be used to detect motion in front of the window. A TOF sensor allows distance to be measured with minimal power and processing time.

In a Point-of-Sale (POS) environment, it is often useful to know a relative location of subject (e.g., product, person, etc.) being identified to that of the cameras or other sensors used.

For some product scanners, such as the NCR 7840 available from NCR Corporation of Atlanta, Ga. and similar scanners, much of the data processing is performed using the processor, e.g., CPU, GPU, and other shared system resources, of a computer controlling operation of a POS terminal. Reducing the use of these resources when there is no object in front of the scanner allows these resources to be used for other purposes, reduces system electricity consumption, and allows the system to respond faster when an object is in front of the scan window.

Some embodiments are also beneficial for security applications where the scanner appears to be 'off' to the user, customer, and others, and detection of movement is valuable, such as to capture images or record video of potentially nefarious behaviors.

Some embodiments also include controlling camera focus, such as focus on top side security cameras, allowing the camera to be used for barcode and watermark reading of the top sides of objects of varying heights. Some of these and other embodiments are also adapted to control focus, lighting, and integration time adjustments for difficult to read barcodes.

Some embodiments also utilize such sensors to identify motion in areas of a product scanner or objects in front of the product scanner. For example, if objects are not moving, processing time is not allocated for attempting to identify the same objects.

Further, such sensors are utilized in some embodiments, to identify whether an item is sufficiently close enough to window to deactivate and identify security tags, such as may be communicated with via radio devices or can be deactivated by transmitting a radio signal at one or both of a particular frequency and power.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical computing system 100 architectural diagram, according to an example embodiment. The system 100 is an example of an embodiment where one or more POS terminals 104, 114 are coupled to a computer 102, the resources of which may be used or shared by the POS terminals 104, 114. As illustrated, each of the POS terminals 104, 114 includes a product scanner 106, 116 and may also include a security tag reader/deactivation device 108, 118. In some embodiments, the POS terminals 104, 114 may be self-service terminals or clerk-assisted terminals.

In operation, an item is presented to at a scanner 106, 116 of a POS terminal 104, 114. A TOF sensor may detect the presence of an item presented by measuring a distance between a scan window of the scanner 106, 116 and the item and activate one or both of the terminal 104, 114 and scanner 106, 116 if one or both are in a dormant state. The measured distance may be provided to a process of the computer 102 to accomplish this and other processing. The processing may further include sending a focus command generated based on the measured distance to one or more cameras of the scanner 106, 116 that are focusable. The processing may also or alternatively include sending one or more lighting commands to scan field lighting elements located as part of or near the product scanner 106, 116 to provide lighting of the item presented for scanning.

Figure 2:
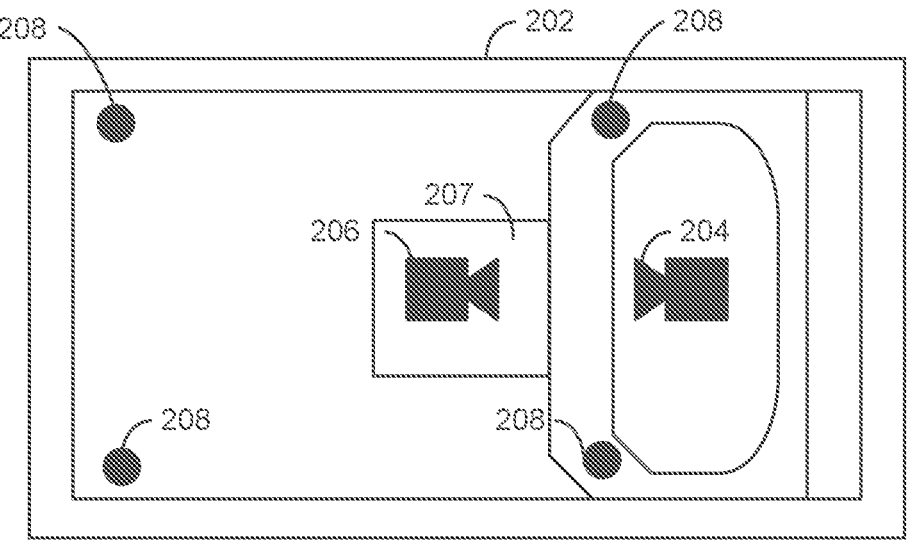
FIG. 2 is a logical block diagram of a scanner, according to an example embodiment.

FIG. 2 is a logical block diagram of a scanner 202, according to an example embodiment. The scanner 202 may be a bioptic scanner or other scanner type. The scanner 202 of the illustrated embodiment includes two cameras 204, 206 each of which also includes a co-located TOF sensor, such as is illustrated and described with regard to FIG. 3. The scanner 202 also includes scan field lighting elements 208 that may be adjusted to illuminate the scan field according to a distance of an item presented for scanning from a scanning window.

Figure 3:
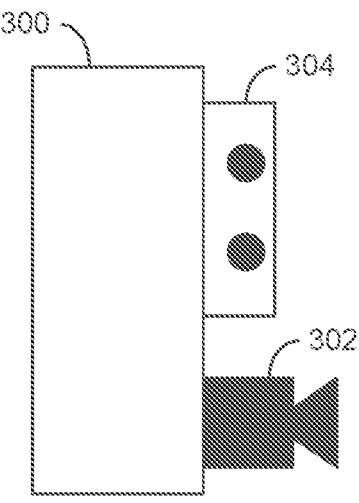
FIG. 3 is a logical block diagram of an integrated circuit board with a camera and a Time-of-Flight sensor included thereon, according to an example embodiment.

FIG. 3 is a logical block diagram of an integrated circuit board 30) with a camera 302 and a TOF sensor 304 included thereon, according to an example embodiment. The TOF sensor may be a laser-based measuring TOF sensor device, such as the VL53LOX TOF laser-ranging module available from STMicroelectronics headquartered in Geneva, Switzerland. In other embodiments, the TOF sensor may be an acoustic distance measuring device.

Figure 4:
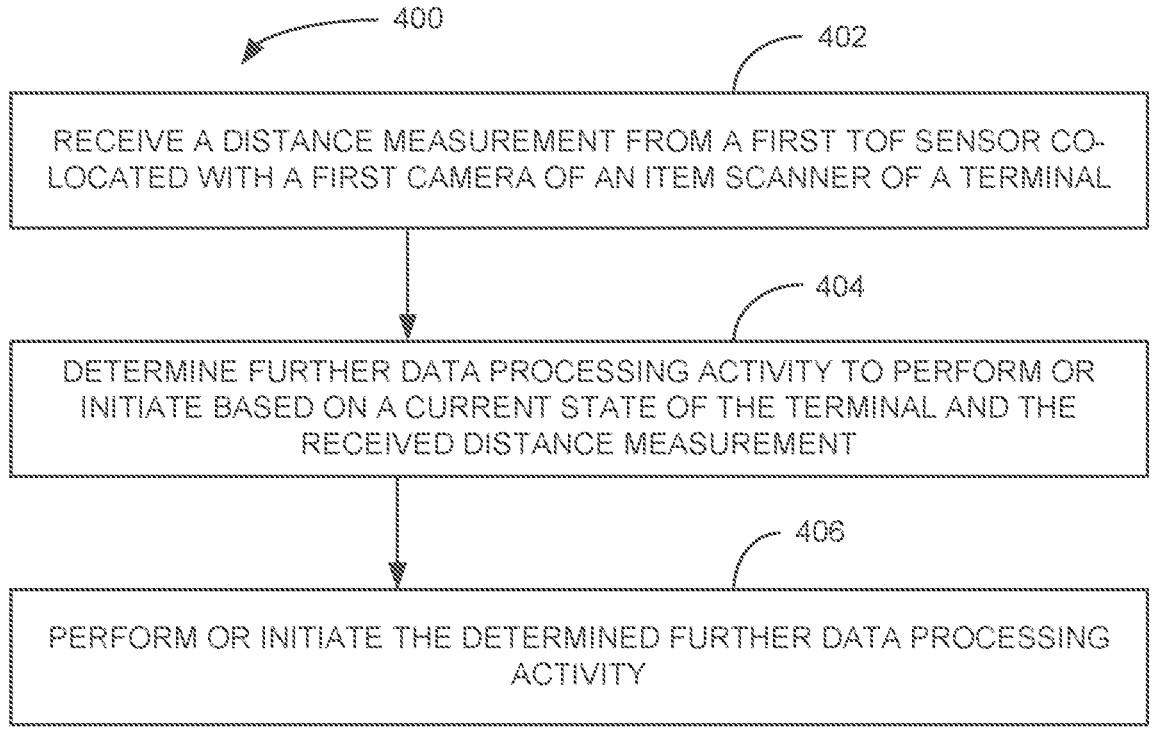
FIG. 4 is a block flow diagram of a method, according to an example embodiment.

FIG. 4 is a block flow diagram of a method 400, according to an example embodiment. The method 400 is an example of a method that may be performed, such as in whole or part by computer 102 of FIG. 1, to control some operations of a POS terminal, such as the terminals 106, 116 also of FIG. 1.

The method 4(t) includes receiving 402 a distance measurement from a first TOF sensor co-located with a first camera of an item scanner of a terminal and determining 404 further data processing activity to perform or initiate based on a current state of the terminal and the received distance measurement. The method 400 may then perform 406 or initiate the determined further data processing activity.

In some embodiments of the method 400, the determined 404 further data processing activity includes removing the terminal from a dormant mode to an active mode when the measured distance is within a threshold. The threshold may be set to a distance that is relevant to the particular embodiment, but is generally set to coincide with a distance that indicates a transaction is to be conducted utilizing a scanner of a terminal. That threshold distance may, for example, be twelve inches from a scanner scanning window indicating an item is being presented for scanning.

In some embodiments, the determined 404 further data processing activity includes resetting a timeout period, expiration of which initiates data processing to place the terminal in a dormant mode. For example, when an item is presented for scanning, the timeout period is reset. After the timeout period expires, the scanner or terminal to which that scanner is associated may be placed in a dormant mode that consumes less electricity and utilizes fewer computing resources, some of which may be shared with one or more other terminals. However, in some embodiments, when the terminal is in the dormant mode, at least one camera of the item scanner of the terminal may continue capturing images that are provided to the processor for image processing, such as for identifying when the terminal should be switched to an active mode, motion detection processing, for storing images or video for security purposes, and other such uses.

Some embodiments of the method 400 also include reading a product identifier of an item included within an image from a camera of the product scanner. In some such embodiments, the further data processing activity to perform 406 or initiate includes deactivating a security device associated with the item.

In some embodiments the product scanner may be a bioptic scanner with at least two cameras, each of which is accompanied by a TOF sensor. In some such embodiments, the method 400 includes receiving a second distance measurement from a second TOF sensor co-located with a second camera of the item scanner of the terminal. The method 400 may then calculate size factor data from the first and second distance measurements, such as may represent sizing or other characteristics of the item presented for scanning. These embodiments may then retrieve stored size factor data based on the product identifier, such as may be read from a barcode, watermark, or other data revealed from a captured image of the product or read from a radio frequency identification tag (RFID) of the presented item or otherwise. The method 400 then compares the calculated size factor data with the retrieved size factor data to determine if there is a size match within a threshold and when there is not a size match, performing exception processing. Exception processing may include triggering an interrupt that requires a supervising employee to clear for the transaction to proceed.

Figure 5:
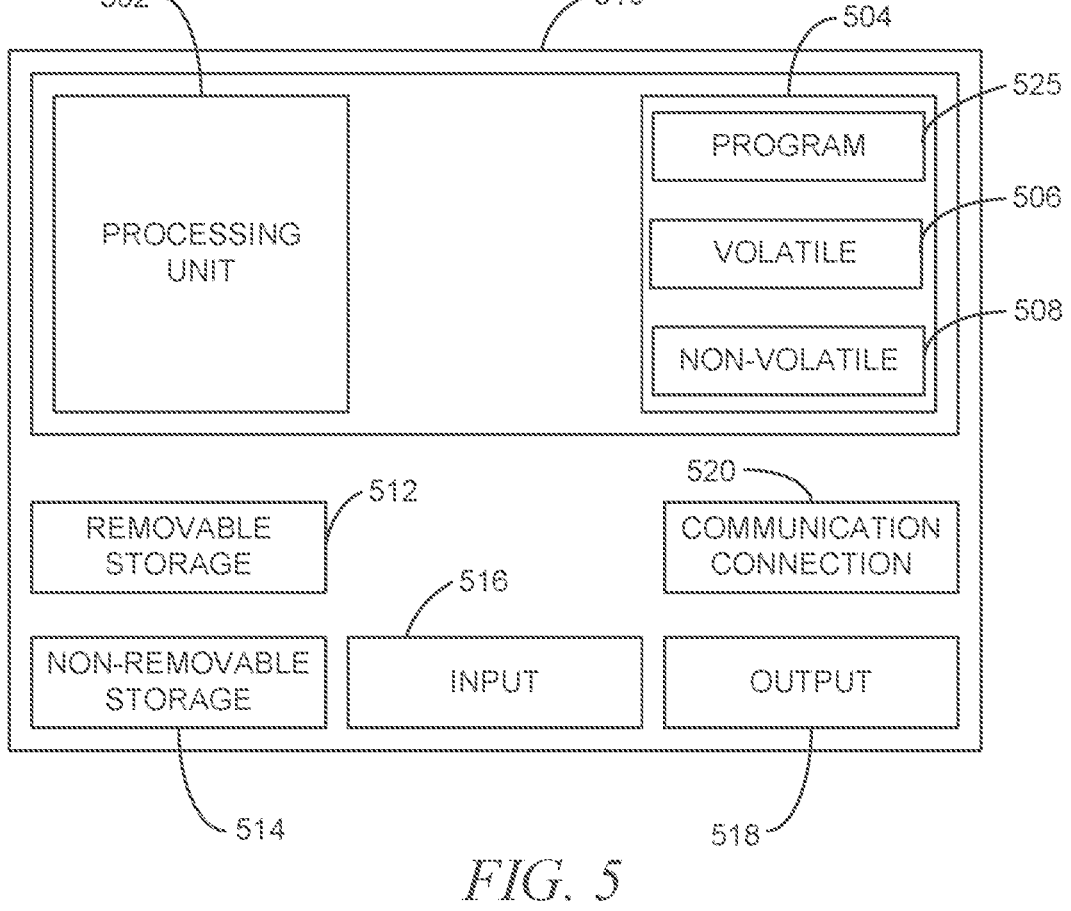
FIG. 5 is a block diagram of a computing device, according to an example embodiment.

FIG. 5 is a block diagram of a computing device, according to an example embodiment. The computing device of FIG. 5 is an example of a computing device that may be implemented, in some embodiments, as the computer 102 of FIG. 1.

Returning to FIG. 5, in one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM). Digital Versatile Disks

6

(DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet. and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
    a processor; at least two point-of-sale (POS) terminals comprising a first terminal and a second terminal;
    an integrated circuit board that comprises two cameras and each camera comprises at least one time-of-flight (TOF) sensor;
    an item scanner deployed at one of the at least two POS terminals, wherein the item scanner includes the integrated circuit board and operates to measure distances between corresponding TOF sensors and a subject captured in an image by at least one of the two cameras;
    wherein the item scanner further utilizes distance measurements to optimize focus and adjust lighting elements for enhanced image capture, and wherein the item scanner further adjusts at least two lighting elements that illuminate light in a scan field of the item scanner based on the distance measurements;

at least one memory with instructions stored thereon that are executable by the processor to control each POS terminal, the instructions executable with regard to a first terminal to perform:

receiving a first distance measurement from a first TOF sensor of a first camera for an item scanner of the first terminal;

determining data processing activities based on a current operational state of the first terminal and the first distance measurement, wherein the first terminal is in an active mode of operation;

performing or initiating the determined data processing activities; and transitioning the second terminal from the active mode of operation to a dormant mode of operation to enable freeing up resources of the second terminal and enabling usage of the resources of the second terminal for servicing the determined data processing activities of the first terminal;

wherein the at least two POS terminals are controlled by a single computer, and wherein the resources are resources of the processor.

2. The system of claim 1, wherein each TOF sensor includes an infrared laser to measure the distance.

3. The system of claim 1, wherein the determined data processing activities include removing the first terminal from the dormant mode of operation to an active mode when the distance measured is within a threshold.

4. The system of claim 1, wherein the determined data processing activities include resetting a timeout period, expiration of which initiates data processing to place the first terminal in the dormant mode of operation.

5. The system of claim 4, wherein when the first terminal is in the dormant mode of operation, at least one camera of the two cameras for the item scanner of the first terminal continues capturing images that are provided to the processor for image processing.

6. The system of claim 5, wherein the image processing of an image received from the item scanner while the first terminal is in the dormant mode of operation includes at least one of motion detection processing and image recording.

7. The system of claim 1, the data processing activities further comprising:

reading a product identifier of an item included within the image.

8. The system of claim 7, wherein the data processing activities include deactivating a security device associated with the item.

9. The system of claim 7, the determined data processing activities further comprise:

receiving a second distance measurement from a second TOF sensor of a second camera for the item scanner of the first terminal;

calculating size factor data from the first distance measurement and the second distance measurement;

retrieving stored size factor data based on the product identifier;

comparing the calculated size factor data with the retrieved size factor data to determine if there is a size match within a threshold; and performing exception processing when there is not a size match.

10. A method comprising:

receiving, by a processor of a single computer, a distance measurement from a first time-of-flight (TOF) sensor of an integrated circuit board, wherein the integrated circuit board further includes a first camera having the first TOF sensor and a second camera having a second TOF sensor for an item scanner of a first point-of-sale (POS) terminal;

determining, by the processor, data processing activities to perform or initiate based on a current operational state of the first POS terminal and the received distance measurement;

utilizing, by the processor, the received distance measurement to optimize focus and adjust lighting for enhanced image capture;

adjusting, by the processor, at least two lighting elements that illuminate light in a scan field of the item scanner based on the received distance measurement;

performing or initiating, by the processor, the determined data processing activities; and transitioning a second POS terminal from an active operational state to a dormant operational state to enable freeing up resources of the second POS terminal and enabling usage of the resources of the second POS terminal for servicing the determined data processing activities of the first POS terminal;

wherein the first POS terminal and the second POS terminal are controlled by the processor, and wherein the resources are resources of the processor.

11. The method of claim 10, wherein the first TOF sensor includes an acoustic sensor to measure a distance.

12. The method of claim 10, wherein the determined data processing activities include removing the first POS terminal from the dormant operational state to the active operational state when the received distance measured is within a threshold.

13. The method of claim 10, wherein the determined data processing activities include resetting a timeout period, expiration of which initiates data processing to place the first POS terminal in the dormant operational state.

14. The method of claim 13, wherein when the first POS terminal is in the dormant operational state, at least one camera of the item scanner of the first POS terminal continues capturing images that are provided to a processor to enable image processing.

15. The method of claim 14, wherein the image processing of an image received from the item scanner while the first POS terminal is in the dormant operational state includes at least one of motion detection processing and image recording.

16. The method of claim 10, further comprising:

reading a product identifier of an item included within an image from at least one camera of the item scanner.

17. The method of claim 16, wherein the determined data processing activities include deactivating a security device associated with the item.

18. The method of claim 16, the determined data processing activities further comprise:

receiving a second distance measurement from the second TOF sensor of the integrated circuit board, wherein the integrated circuit board further includes the second camera of the item scanner of the first POS terminal;

calculating size factor data from the distance measurement and the second distance measurement;

retrieving stored size factor data based on the product identifier;

comparing the calculated size factor data with the retrieved size factor data to determine if there is a size match within a threshold; and performing exception processing when there is not a size match.

19. A method comprising:

reading, by a processor of a single computer, a product identifier of an item presented to a product scanner of a first point-of-sale (POS) terminal;

receiving, by the processor, a distance measurement from a first time-of-flight (TOF) sensor of an integrated circuit board for the product scanner of the POS terminal, wherein the first TOF sensor associated with a first camera of the product scanner, and wherein the integrated circuit board further includes a second camera having a second TOF sensor;

utilizing, by the processor, the received distance measurement to optimize focus and adjust lighting for enhanced image capture;

adjusting, by the processor, at least two lighting elements that illuminate light in a scan field of the product scanner based on the received distance measurement;

performing, by the processor, data processing activities based on a current operational state of the first POS terminal and the received distance measurement; and transitioning, by the processor, a second POS terminal from an active operational state to a dormant operational state to enable freeing up resources of the second POS terminal and enabling usage of the resources of the second POS terminal for servicing the data processing activities of the first POS terminal;

wherein the first POS terminal and the second POS terminal are controlled by the single computer, and wherein the resources are resources of the single computer.

20. The method of claim 19, wherein the data processing activities include sending a command to a security tag deactivation device to transmit a signal to deactivate a security tag within proximity of the first POS terminal.

* * * * *